Dec. 23, 1924.
J. H. LACY
AUTOMOBILE CHOKER PROTECTOR
Filed Oct. 10, 1924
1,520,064
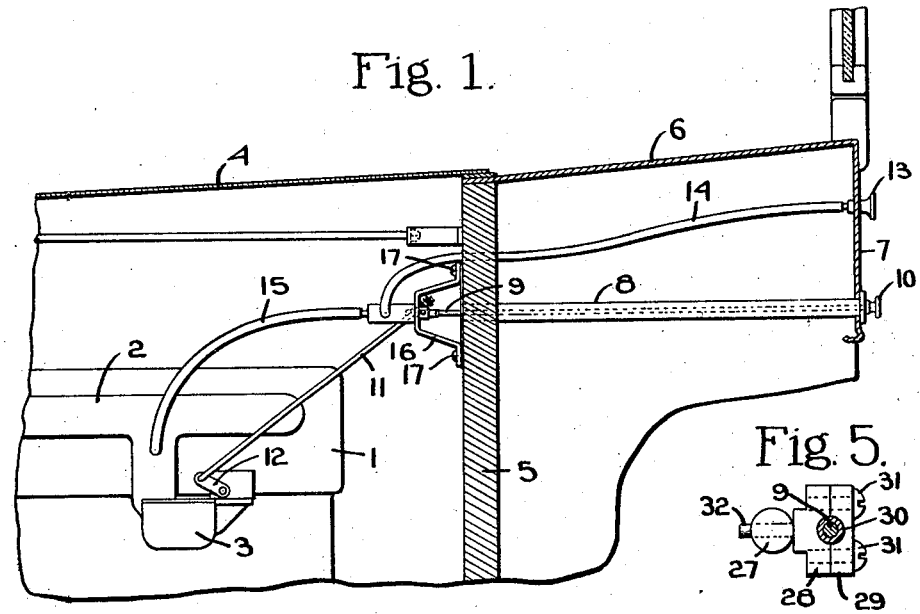
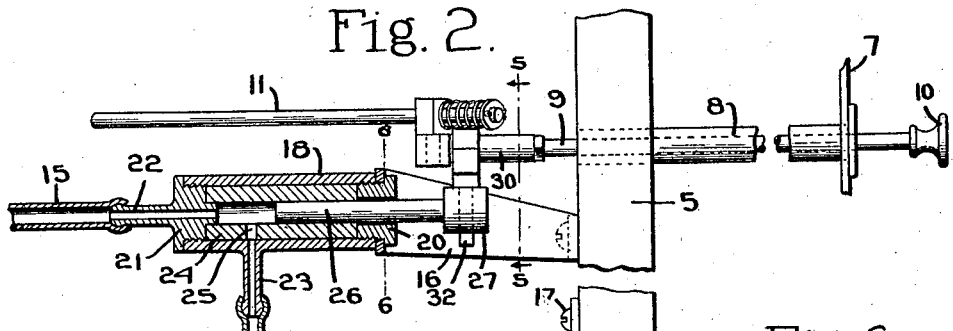
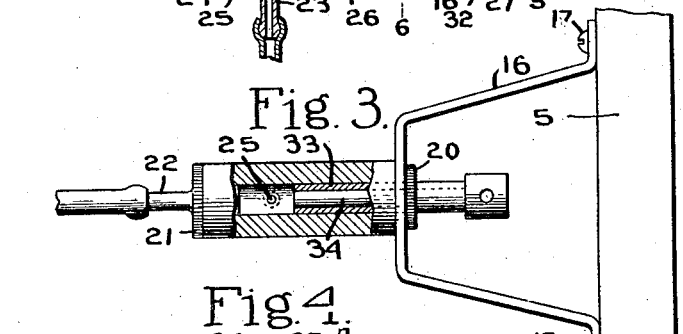
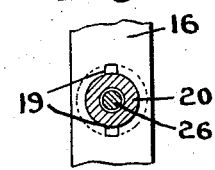
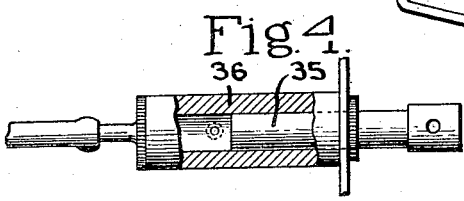
Inventor.
John H. Lacy
by Heard Smith Hammack
Attys Patented Dec. 23, 1924.

1,520,064

UNITED STATES PATENT OFFICE.

JOHN HOWARD LACY, OF BOSTON, MASSACHUSETTS.

AUTOMOBILE CHOKER PROTECTOR.

Application filed October 10, 1924. Serial No. 742,921.

*To all whom it may concern:*

Be it known that I, JOHN H. LACY, a citizen of the United States, and a resident of Boston, county of Suffolk, State of Massachusetts, have invented an Improvement in Automobile Choker Protectors, of which the following description, in connection with the accompanying drawing, is a specification, like characters on the drawing representing like parts.

Automobiles provided with the ordinary types of hydrocarbon or combustion engines are usually provided with a so-called "choker", by means of which, as when starting the engine, an increase in the richness of the hydrocarbon mixture supplied to the engine is secured. The handle of the choker actuator or rod is usually placed at some conveniently accessible spot, as upon the instrument board, and when moved to open position usually acts to cut down the supply of air to the carburetor and thus produce an increased suction upon the hydrocarbon supply and thus materially increase the relative amount of hydrocarbon in the mixture supplied to the engine. While this is desirable in starting the engine, or occasionally at other times, serious injury may and often does result if the choker be left open and the rich mixture continues to be supplied to the engine. In the case of gasoline, the ordinary hydrocarbon used, the gasoline cuts the lubricating oil in the cylinder, works down past the piston and rapidly thins out the lubricating oil in the crank case, thus interfering with the proper lubrication of the engine and not infrequently resulting in the scoring of the cylinder, the destruction of the bearings and other injuries. It is very important, therefore, that the choker shall be returned to closed position as soon as the necessity for its use has ceased.

The object of the present invention is to provide a signal mechanism, preferably in the form of a whistle or pneumatically actuated signal, which shall be actuated or sounded whenever the choker is in open position, so that the operator of the engine may be constantly reminded of the fact that the choker is in use and of the necessity of moving the choker into closed position as soon as possible.

While this invention is peculiarly applicable to automobile vehicles, it is to be understood that by the term "automobile" there is to be included any machine or device employing a choker for the purposes hereinbefore mentioned.

The nature and objects of the invention will appear more fully from the accompanying description and drawings and will be particularly pointed out in the claims.

In the drawings:

Fig. 1 is a view partially in side elevation and partially in vertical cross section and a more or less diagrammatic form of a portion of an automobile illustrating a preferred form of the invention embodied therein.

Fig. 2 is a view chiefly in horizontal cross section of the construction shown in Fig. 1.

Fig. 3 is a side elevation partially broken away of a portion of the construction shown in Fig. 2, with a variation in a form of the valve.

Fig. 4 is a view similar to Fig. 3 illustrating another variation in the form of the valve.

Fig. 5 is a view in cross section on the line 5—5 of Fig. 2 looking toward the left.

Fig. 6 is a view in cross section on the line 6—6 of Fig. 2 looking toward the left.

A preferred form of the invention is illustrated in connection with an ordinary type of automobile. A portion of the engine 1 is illustrated provided with the usual manifold 2 and with a carbureter 3, through which the mixture of hydrocarbon and air is supplied to the manifold and thence to the engine. The engine is shown as located under the usual hood 4 and in front of the vertical wall 5, which separates the engine from the body of the vehicle. A cowl 6 extends rearwardly from the hood and at the rear of the cowl is mounted the usual instrument board 7. A tubular guide 8 extends across the space between the wall 5 and the instrument board 7, and the choker actuator in the form of a rod 9 is mounted to slide in this guide and presents at its rear end a handle 10 at the face of the instrument board, where it may readily be reached and operated by the driver. This choker rod is shown as connected by a link 11 to an arm 12, connected in turn with a valve, not shown, in the carbureter 3. All of this construction is familiar and needs no further description. When it is desired to enrich the mixture supplied to the engine, the driver pulls on the handle 10 moving the choker rod to its open position. This operation effects the desired result, usually by shutting down the air supplied into the carburetor and thus increasing the suction into the hydrocarbon supply in the carburetor and thus in turn enriching the mixture supplied to the engine. The choking action may be sufficient to supply nothing but hydrocarbon to the engine. This device is very useful in starting the engine and occasionally when a rich mixture is momentarily desired. But as already pointed out, if the choker be left in open position, it may, and frequently does, lead to serious injury to the engine and the bearings.

The present invention provides a signal which is actuated whenever the choker actuator is in open position. While this signal and the means for actuating it may be of various types within the scope of the invention, there is herein shown as a preferred and convenient type a pneumatically actuated normally inactive signal. This is shown as a whistle 13 mounted at any convenient point and herein shown as mounted upon the instrument board 7. The pneumatic actuation of this signal may also be secured in any convenient manner. As illustrated, the signal inducing flow of air is secured from the intake manifold, where suction is always present when the engine is running.

A pipe herein shown as a rubber tube in two sections 14 and 15, extends from the signal 13 to the intake manifold 2. The signal inducing flow of air through this pipe, in this invention, is controlled by an interposed valve mechanism which in turn is under the control of the choker actuator so as to produce the required results.

In the construction illustrated as a sample and preferred form of the invention, a bracket 16 is fastened as by the screws 17 to the front of the wall 5. On the face of this bracket is mounted a cylindrical valve casing 18. At the rear end this casing may be provided with lugs 19 seated in notches or recesses in the bracket 16. A headed hollow plug 20 is passed through the bracket 16 and threaded into the cylinder 18, thus locking the cylinder firmly in position on the bracket. At the opposite or front end, the cylinder 18 is provided with a similar headed hollow plug 21, terminating in a nipple 22 connecting with the pipe section 15. The valve casing at one side is provided with another nipple 23 connecting with the pipe section 14. A rubber packing sleeve, consisting of a section of sleeve rubber tube 24, is mounted to slide through the plug 20 and to fit snugly and slide in the packing sleeve 24. In its rear end, this valve rod is provided with a head 27 transversely apertured.

The bracket 16 is mounted so as to bring the valve casing adjacent the choker rod and as shown preferably to bring the head 27 of the valve rod closely adjacent the forward end of the choker rod. A connection is made between the choker rod and the valve rod so that these two parts will move together. For this purpose is shown a simple clamping connection illustrated in detail in Fig. 5. A two part clamp 28 and 29 is fitted over the forward end of the choker rod, which at this end is provided with a head 30 forming part of the connection to the link 11 and is clamped thereto by the screws 31. A pin 32, rigidly connected to the clamp member 28, projects laterally and is passed through the transverse aperture in the head 27 of the valve rod 26.

The operation of the device will now be apparent. When the choker actuator or rod is in its normal or closed position, the valve rod 26 extends past the aperture 25, or side opening, in the valve casing and thus cuts off the connection between the pipe sections 14 and 15 and prevents any signal inducing flow of air such as would be caused by the suction of the engine in the manifold from operating the signal. When, however, the choker actuator or rod is moved to open position, as shown in Fig. 2, the valve rod 26 is simultaneously moved to uncover the opening 25 and thereupon the pipe sections 14 and 15 are connected, affording a clear passageway from the intake manifold to the signal, and the signal is at once actuated. The signal, it will be observed, continues in operation just so long as the engine is running and thus producing the required flow of air when the choker rod is in open position. The driver is thus continually reminded that the choker rod is in open position and will restore it to closed position when the need for its use has ceased.

The rubber packing sleeve illustrated in Fig. 2 affords a very convenient and simple element in the valve construction. But this sleeve may be either a part of the valve casing or a part of the valve rod. Fig. 3 illustrates the latter form, where the rubber packing sleeve 33 is secured to the valve rod 34 and slides therewith. If the parts be made with more care and more accurately fitted, the valve rod may fit directly the interior of the valve casing, as shown in Fig. 4, where the valve rod 35 slides in the cylindrical casing 36 without interposition of the valve sleeve.

While specific embodiments and adaptations of the invention have been illustrated and described, it is to be understood that the invention is broad in its aspects and is not to be restricted beyond the scope hereinbefore set forth and hereinafter defined in the claims.

Having thus described the invention, what is claimed as new and desired to be secured by Letters Patent, is:

1. In an automobile a choker actuator acting, when moved to open position, to permit an increase in the richness of the mixture supplied to the engine, a pneumatically actuated normally inactive signal, and means controlled by the said movement of the choker actuator to render the signal operative.

2. In an automobile a choker actuator acting, when moved to open position, to permit an increase in the richness of the mixture supplied to the engine, a suction actuated signal, a pipe connecting the signal to the intake manifold, a valve interposed in the pipe, and connections between the valve and the choker actuator acting to effect the closing of the valve when the choker actuator is in closed position and to effect the opening of the valve when the choker actuator is moved to open position, whereby the signal will be operated whenever the engine is running with the choker actuator in open position.

3. In an automobile a choker actuator acting, when moved to open position, to permit an increase in the richness of the mixture supplied to the engine, a pneumatically actuated normally inactive signal, a pipe connected to the signal, means for inducing a flow of air in the pipe sufficient to actuate the signal and means controlled by the choker actuator acting to cut off the signal actuating flow of air when the choker actuator is in closed position and to permit the said flow when the choker actuator is moved to open position.

4. In an automobile a choker rod acting, when moved to open position, to permit an increase in the mixture supplied to the engine, a valve casing mounted adjacent a choker rod, a suction actuated signal, a pipe section connecting the valve casing to the signal, a pipe section connecting the valve casing to the intake manifold and a valve rod connected to the choker rod to move therewith and acting, when the choker rod is moved to open position, to connect the pipe sections and thus permit the operation of the signal and acting, when the choker rod is moved to closed position, to cut off the connection between the pipe sections and thus prevent the operation of the signal.

5. In an automobile the construction defined in claim 4 in which a rubber packing sleeve is interposed between the valve rod and the valve casing and is connected to one of said elements.

6. In an automobile the construction defined in claim 4 in which a rubber packing sleeve is secured in the valve casing surrounding the valve rod the said sleeve having its end opening opposite the opening of one pipe section and having a side opening opposite the opening of the other pipe section with the latter opening positioned to be closed and opened by the valve rod.

7. In an automobile a pneumatically actuated signal, a signal actuating source of air, a pipe connecting the signal and the signal actuating source of air, a sliding choker rod, a valve casing mounted adjacent the choker rod and interposed in the pipe, a slide valve in the casing and a connection between the choker rod and the sliding valve whereby the position of the choker rod in turn controls the actuation of the signal.

8. In an automobile a choker actuator acting, when moved to open position, to permit an increase in the richness of the mixture supplied to the engine, a signal, and signal actuating means controlled by the movement of the choker rod to open position to effect the actuation of the signal.

In testimony whereof, I have signed my name to this specification.

JOHN HOWARD LACY.

Certificate of Correction.

It is hereby certified that in Letters Patent No. 1,520,064, granted December 23, 1924, upon the application of John Howard Lacy, of Boston, Massachusetts, for an improvement in "Automobile Choker Protectors," errors appear in the printed specification requiring correction as follows: Page 3, line 70, claim 7, after the word "casing" insert the words *acting to control the passage of air through the pipe*, and line 71, for the word "sliding" read *slide;* and that the said Letters Patent should be read with these corrections therein that the same may conform to the record of the case in the Patent Office.

Signed and sealed this 27th day of January, A. D. 1925.

[SEAL.]                          KARL FENNING,
*Acting Commissioner of Patents.*